(12) United States Patent
Nishimura

(10) Patent No.: US 7,697,015 B2
(45) Date of Patent: Apr. 13, 2010

(54) STORAGE MEDIUM AND GAME DEVICE STORING IMAGE GENERATING PROGRAM

(75) Inventor: Katsuhito Nishimura, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1594 days.

(21) Appl. No.: 10/820,057

(22) Filed: Apr. 8, 2004

(65) Prior Publication Data

US 2005/0009602 A1 Jan. 13, 2005

(30) Foreign Application Priority Data

Jul. 8, 2003 (JP) .............................. 2003-272026

(51) Int. Cl.
*G09G 5/00* (2006.01)
*A63F 9/24* (2006.01)
*A63F 13/00* (2006.01)
*G06F 17/00* (2006.01)
*G06F 19/00* (2006.01)

(52) U.S. Cl. .................. 345/640; 345/619; 463/32; 463/33

(58) Field of Classification Search .......... 345/640, 345/419; 463/32, 33
See application file for complete search history.

(56) References Cited

U.S. PATENT DOCUMENTS

| 5,830,066 | A * | 11/1998 | Goden et al. ............ 463/33 |
| 6,419,582 | B1 * | 7/2002 | Goden et al. ............ 463/33 |
| 6,501,468 | B1 * | 12/2002 | Kaji ..................... 345/419 |
| 7,207,884 | B2 * | 4/2007 | Goden et al. ............ 463/33 |
| 2001/0038386 | A1 * | 11/2001 | Numaoka .............. 345/427 |

FOREIGN PATENT DOCUMENTS

| JP | 10-165647 | 6/1998 | |
| JP | 2000-202162 | * 7/2000 | ............ 345/420 |

* cited by examiner

*Primary Examiner*—Kee M Tung
*Assistant Examiner*—Jacinta Crawford
(74) *Attorney, Agent, or Firm*—Nixon & Vanderhye P.C.

(57) ABSTRACT

In accordance with a level of importance of a character, a weight is provided for the character. For example, a character operated by a player is provided with a weight heavier than those provided for other characters, and other characters are provided with the respective weights lighter than that provided for the character operated by the player. Based on the weights and positions of the characters placed in a predetermined area, a position of a sight point of a virtual camera is determined. Thus, it is possible to generate a display image in which a plurality of characters in a virtual space are placed on a screen in a balanced manner.

13 Claims, 16 Drawing Sheets

F I G. 1
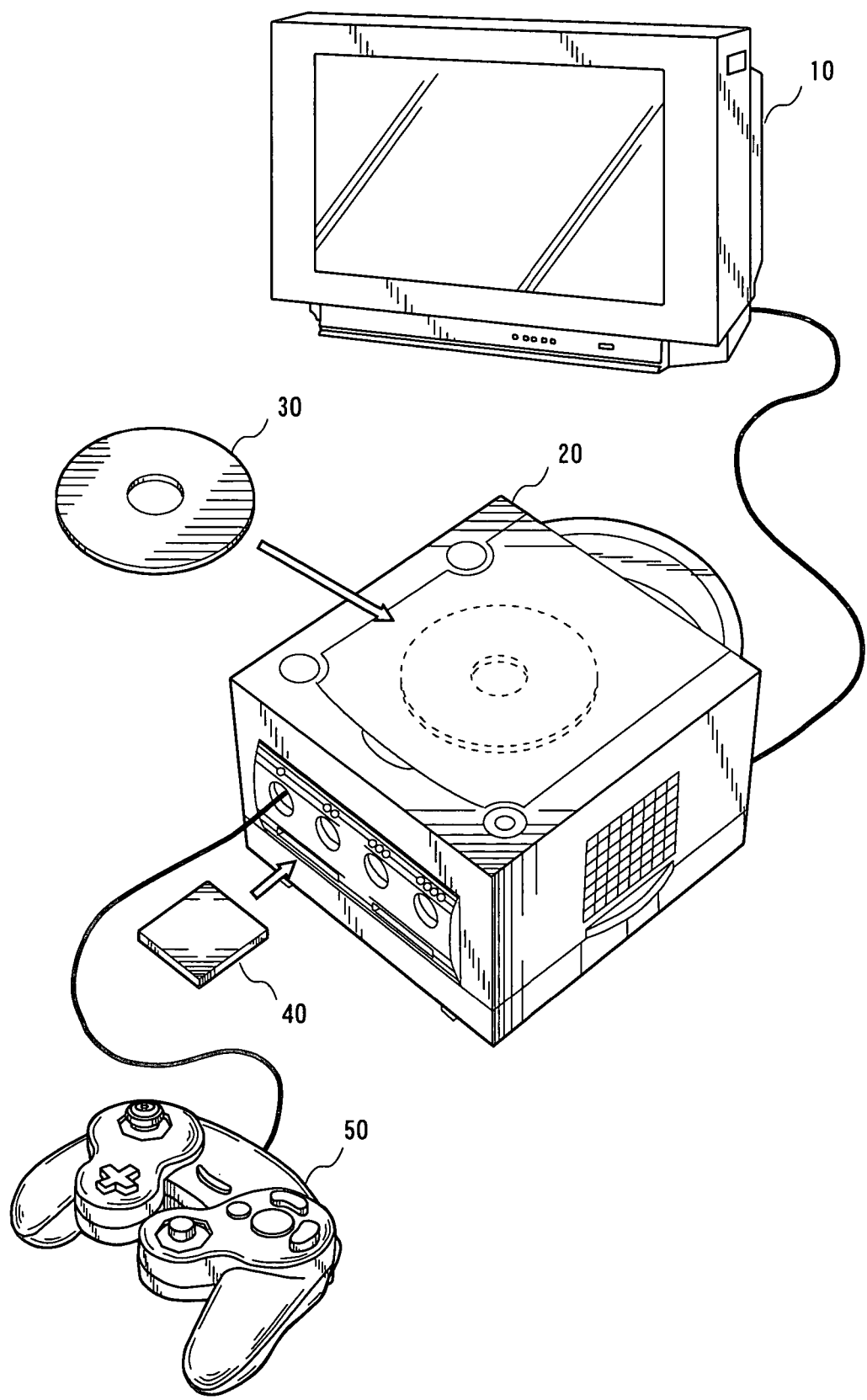

F I G. 3
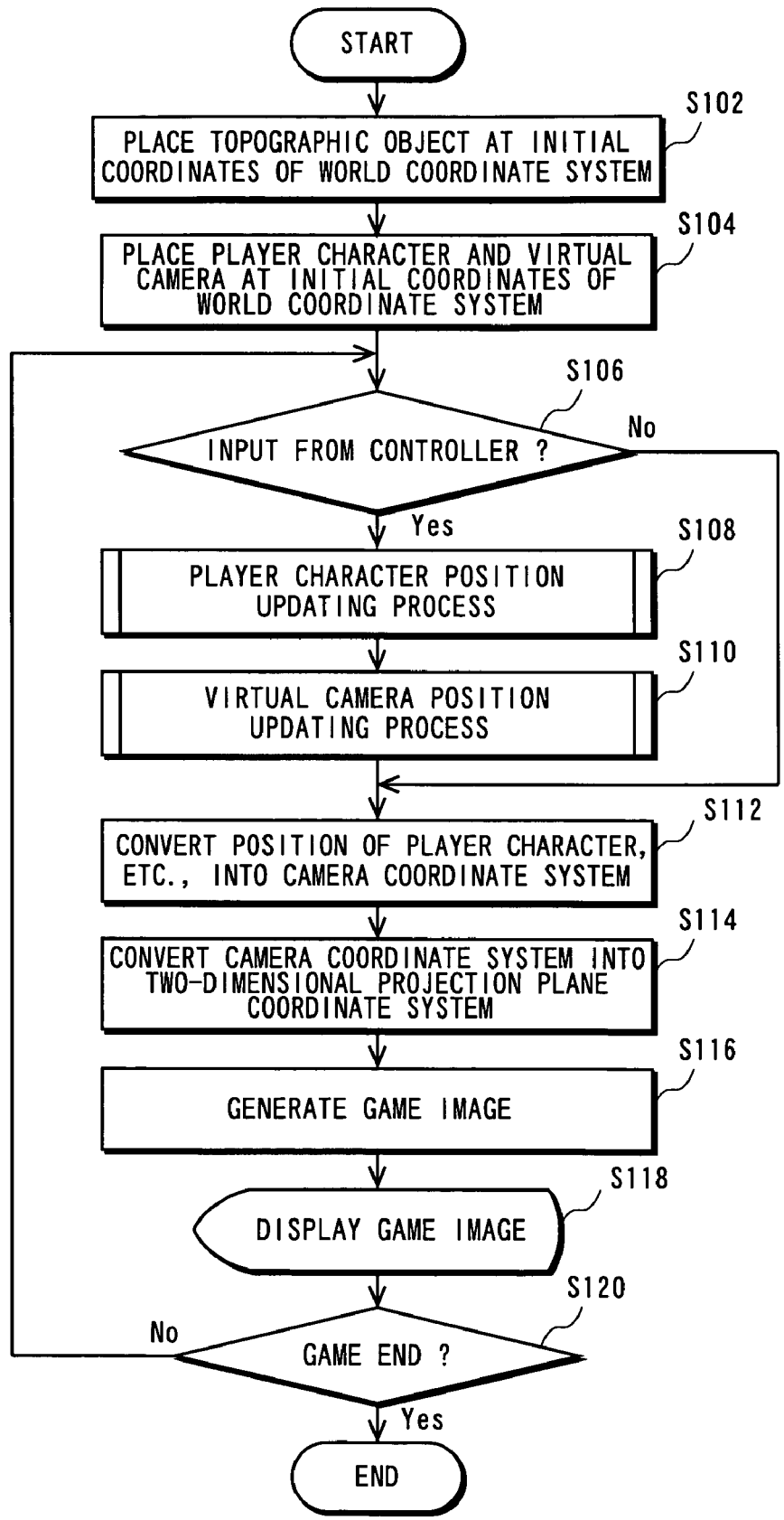

F I G. 6

| CHARACTER | WEIGHT | POSITION |
|---|---|---|
| PLAYER CHARACTER | 10 | (Xp, Yp, Zp) |
| FRIEND CHARACTER f a | 1 | (Xfa, Yfa, Zfa) |
| FRIEND CHARACTER f b | 1 | (Xfb, Yfb, Zfb) |
| FRIEND CHARACTER f c | 1 | (Xfc, Yfc, Zfc) |
| FRIEND CHARACTER f d | 1 | (Xfd, Yfd, Zfd) |
| FRIEND CHARACTER f e | 1 | (Xfe, Yfe, Zfe) |
| ⋮ | ⋮ | ⋮ |
| ENEMY CHARACTER e a | 3 | (Xea, Yea, Zea) |
| ENEMY CHARACTER e b | 3 | (Xeb, Yeb, Zeb) |
| ENEMY CHARACTER e c | 3 | (Xec, Yec, Zec) |
| ⋮ | ⋮ | ⋮ |

FIG. 7

| CHARACTER | LEVEL OF IMPORTANCE |
|---|---|
| PLAYER CHARACTER | A |
| FRIEND CHARACTER f a | C |
| FRIEND CHARACTER f b | C |
| ⋮ | ⋮ |
| ENEMY CHARACTER e a | B |
| ENEMY CHARACTER e b | B |
| ⋮ | ⋮ |

FIG. 8

| LEVEL OF IMPORTANCE | WEIGHT |
|---|---|
| A | 10 |
| B | 3 |
| C | 1 |

FIG. 21
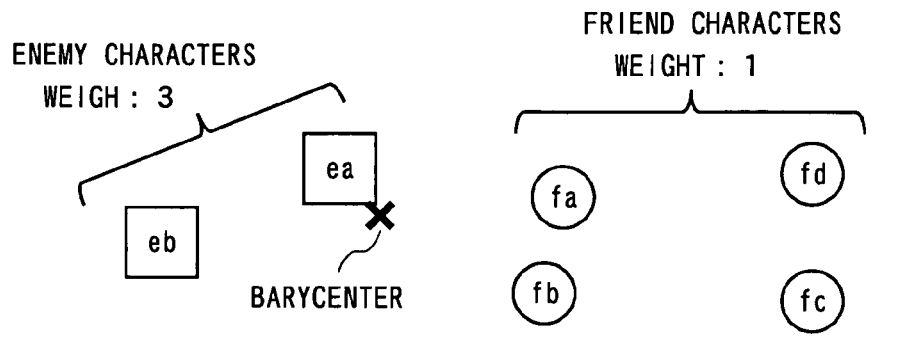
FIG. 22
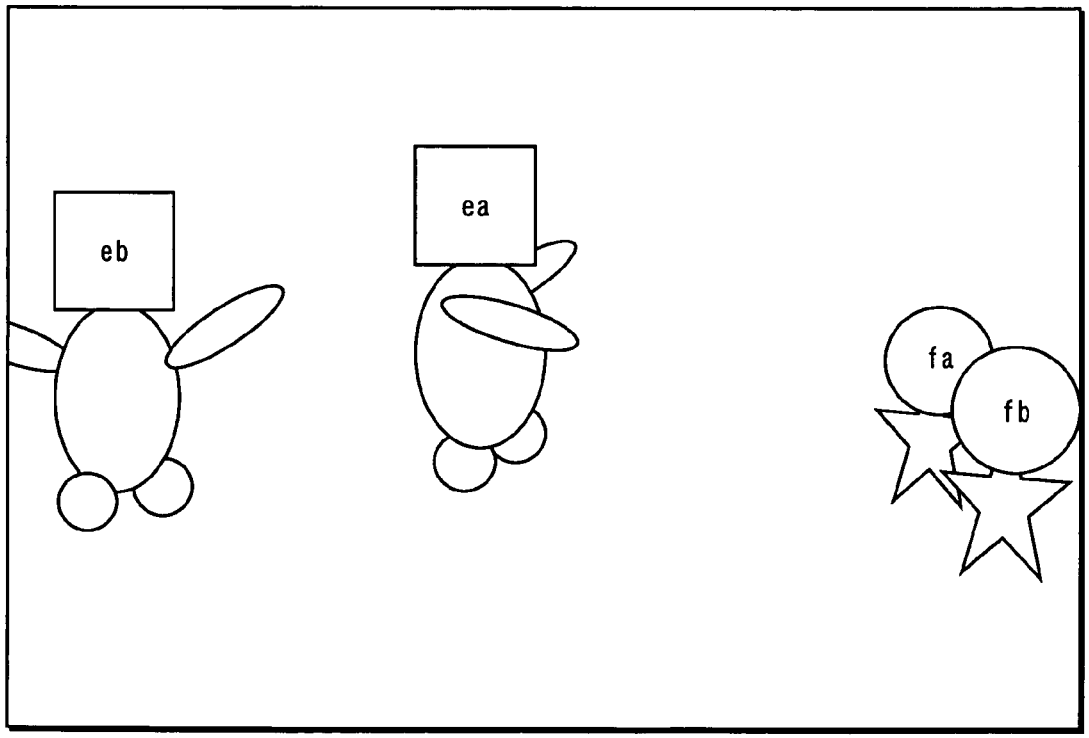

F I G. 2 5
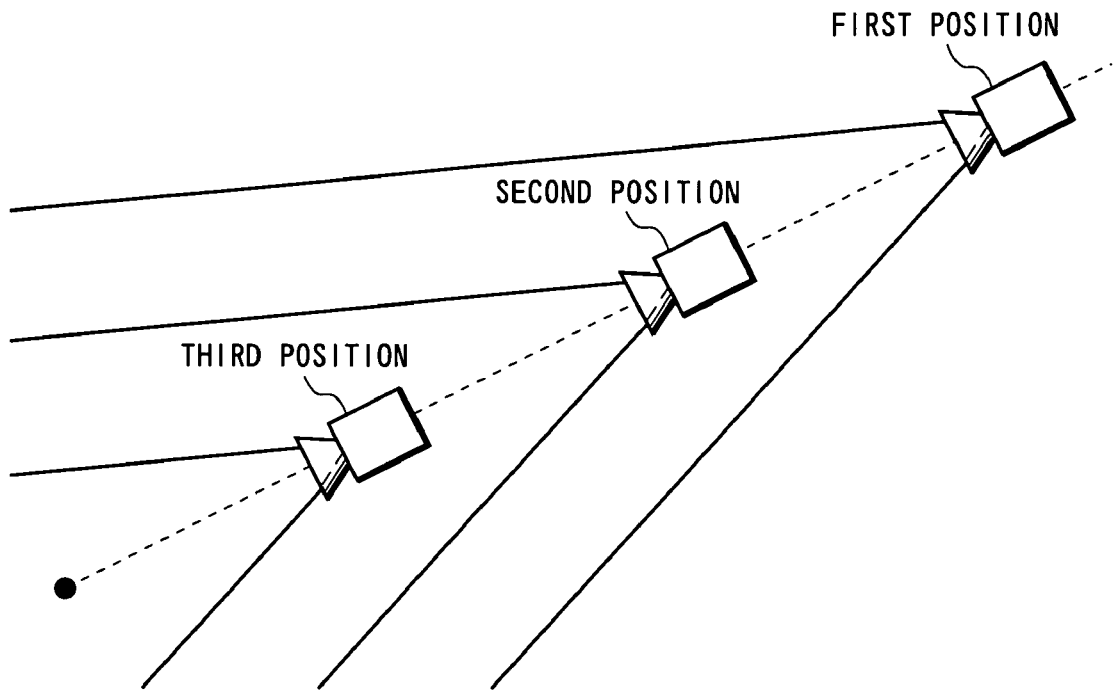
F I G. 2 6
| CHARACTER | POSITION OF VIRTUAL CAMERA | WEIGHT |
|---|---|---|
| PLAYER CHARACTER | FIRST POSITION | 10 |
| | SECOND POSITION | 30 |
| | THIRD POSITION | 50 |

DISPLAY AREA BY VIRTUAL CAMERA PLACED IN FIRST POSITION

PLAYER CHARACTER WEIGHT : 5 0

DISPLAY AREA BY VIRTUAL CAMERA PLACED IN THIRD POSITION

STORAGE MEDIUM AND GAME DEVICE STORING IMAGE GENERATING PROGRAM

FIELD

The technology herein relates to a storage medium and a game device storing an image generating program. More particularly, the technology herein relates to a storage medium and a game device, which stores an image generating program for generating a display image used for displaying a plurality of objects placed in a two-dimensional or three-dimensional virtual space.

BACKGROUND AND SUMMARY

There exist a game machine which displays an image (hereinafter, referred to as an image viewed from a third person viewpoint) taken by a virtual camera placed behind a character operated by a player (a player character), and a game machine which displays an image (hereinafter, referred to as an image viewed from a first person viewpoint) taken by a virtual camera placed in a position of the player character as a scene viewed by the player character.

A sight point of the virtual camera is, in general, fixedly set in a position of the player character, or a position at a predetermined distance from a front of the player character.

Japanese Patent Laid-Open Publication No. H10-165647, for example, discloses a game machine generating an image viewed from the first person viewpoint by setting a sight point based on a character located nearest the virtual camera. If there are a plurality of characters equidistant from the virtual camera, the above-described game machine sets a sight point in an intermediate position of these characters.

However, if the sight point of the virtual camera is fixedly set to the player character, there arise the following problems: when the player character leads a party of friend characters, for example, a balance of the characters' placement on a screen is disrupted, and a party of the friend characters behind the player character may be poorly displayed.

Also, if the sight point is set to a character located nearest the virtual camera, the character nearest the virtual camera is always displayed at the center of the screen. As a result, even if a formidable enemy character is located right outside the display screen, the player has difficulty in locating out the enemy character, which may be a problem.

Furthermore, when an image viewed from a third person viewpoint is generated, it is not preferable to set a sight point to a character located nearest the virtual camera because there is a possibility that a character nearest the virtual camera may be a non-player character. Specifically, in the case where a character located nearest the virtual camera is a non-player character, there is a possibility that only the non-player character is displayed on the screen and the player character is not displayed thereon.

Also, if a sight point is set in an intermediate position of the plurality of characters, there also arises the same problem as described above. For example, when an image showing the player character leading a party of friend characters viewed from a third person viewpoint is generated, there is a possibility that a sight point is set around a center of a party of the friend characters and the player character is not displayed.

The illustrative embodiments provide an image generating program and a game device capable of generating a display image in which characters are displayed in a balanced manner.

If there is a player character, the illustrative embodiments provide an image generating program and a game device capable of generating a display image in which characters are displayed in a balanced manner while displaying the player character preferentially over other characters.

The illustrative embodiments have the following aspects (notes in parentheses indicate exemplary elements which can be found in the illustrative embodiments to follow, though such notes are not intended to limit the scope of the example embodiments).

A storage medium of the illustrative embodiments stores an image generating program which causes a computer to generate a display image used for displaying a plurality of objects placed in a two-dimensional or three-dimensional virtual space. The image generating program causes the computer to function as weight storing means (214, FIG. 6), position storing means (214, FIG. 6), barycenter determination means (202, S306), and display image generating means (202, S116). The weight storing means stores weights of the objects. The position storing means stores positions of the objects in the virtual space. The barycenter determination means determines a barycenter of the objects based on the weights and the positions of the objects. The display image generating means generates a display image in which the barycenter lies in approximately a center of the display image. Here, "an object" corresponds to an arbitrary object in a virtual space, and includes not only a movable object such as a player character or a friend character but also a stationary object such as a treasure box or a tree. Also, each character's weight stored by the weight storing means may be unchangeably fixed to a predetermined value, or may be updated, if necessary.

An object to be displayed preferentially has a heavier weight than other objects. In this case, "an object to be displayed preferentially" includes, for example, an enemy character having a formidable weapon, a boss character, a ball in a baseball game, and a specific tropical fish selected by a user from among a plurality of tropical fishes in a virtual aquarium, etc. That is, "an object to be displayed preferentially" varies depending on the use of the image generating program.

Also, the heaviest weight may be assigned to a player character which is operatable by a player with operation means (50).

Also, a level of importance may be previously provided for each object (FIG. 7), and the image generating program may further cause the computer to function as weight associating means (214, FIG. 8) for assigning a heavier weight to the object for which a higher level of importance is provided compared to other objects.

Also, a weight equal to or greater than the sum of weights of objects other than the player character may be dynamically assigned to the player character (FIGS. 19 and 20).

Also, as the barycenter determination means, the image generating program may cause the computer to determine a barycenter of objects placed within a predetermined area, which is a portion of the virtual space (FIG. 23). A shape of the predetermined area may be arbitrary. For example, the predetermined area may be a closed area whose outer edge is at a predetermined distance from the player character, or may be a rectangular area whose center is at a predetermined distance from a front of the player character.

Also, if a barycenter determined by the barycenter determination means lies in a position away from a position of specific one object of the plurality of objects at equal to or greater than the predetermined distance, the image generating program may cause the computer, as the display image generating means, to generate a display image in which an intersection point of a line segment connecting the barycenter and the specific one object and an outer edge of the allowable limit lies in approximately a center of the display image (FIG. 24).

The above descriptions can be applied to either a two-dimensional virtual space or a three-dimensional virtual space.

If the virtual space is a three-dimensional virtual space, the image generating program may cause the computer, as the display image generating means, to generate a display image using a virtual camera whose sight point is the barycenter. In this case, a weight of specific one object of the plurality of objects may change in accordance with a position of the virtual camera. For example, the closer a distance between the virtual camera and the sight point becomes, the heavier a weight of the specific one object becomes (FIGS. 25 and 26).

Also, if the virtual space is a three-dimensional space, the image generating program may cause the computer, as the display image generating means, to generate a display image by bringing the sight point of a virtual camera closer to the barycenter determined by the barycenter determination means at a constant rate.

A game device of an illustrative embodiment generates a display image used for displaying a plurality of objects placed in a two-dimensional or three-dimensional virtual space. The game device comprises weight storing means (214, FIG. 6), position storing means (214, S306), barycenter determination means (202, S306), and display image generating means (202, S116). The weight storing means stores weights of the objects. The position storing means stores positions of the objects in the virtual space. The barycenter determination means determines a barycenter of the objects based on the weights and the positions of the objects. The display image generating means generates a display image in which the barycenter lies in approximately a center of the display image.

Based on one illustrative embodiment, the barycenter determined based on the weights of the objects lies in approximately a center of a display image, whereby it is possible to display the objects on a display screen in a balanced manner. Also, the barycenter lies near the objects whose weight is heavier than other objects, which makes it easy to generate a display image in which an object with a heavier weight than other objects lies closer to the center of the display screen. Thus, it is possible to obtain a display image capable of displaying objects in a balanced manner while displaying the player character preferentially over other characters, by setting a weight of each character arbitrarily.

Especially, in the case where the heaviest weight is assigned to the player character, the player character is displayed preferentially over other characters, whereby it is possible to prevent the player character from moving outside a display area.

Also, based on a level of importance previously assigned to each character, if an object with a higher level of importance has a heavier weight than other characters, it is possible to display an object with a higher level of importance on a preferential basis.

Also, if a weight equal to or greater than the sum of the weights of other characters is dynamically assigned to the player character, a weight of the player character is increased in accordance with an increase in the number or the weight of other characters, whereby it is possible to facilitate the player character being always displayed.

Also, if the barycenter is determined based on the objects within a predetermined area, it is possible to prevent the barycenter from being set in an unexpected position, and reduce an amount of calculation required for determining the barycenter.

Also, in the case where the barycenter lies outside a predetermined allowable limit which is centered around specific one object, a display image is generated such that an intersection point of a line segment connecting the barycenter and the specific one object and an outer edge of the allowable limit is approximately a center of the display image. In this case, the specific one object can be displayed even if the barycenter moves away from the specific one object.

Also, if the barycenter is set as a sight point of the virtual camera, a display image which is centered around a barycenter in the three-dimensional space can be generated easily.

Also, if a weight of specific one object changes in accordance with a position of the virtual camera, it is possible to perform control, for example, such that the closer the distance between the sight point and the virtual camera becomes, the heavier the weight of the specific one object becomes. In this case, the specific one object can be always displayed even if the virtual camera becomes closer to the sight point.

Also, in the case where a sight point of the virtual camera is brought closer to the barycenter determined by the barycenter determination means at a constant rate, it is possible to prevent a sudden change in a display content even if the position of the barycenter changes abruptly. As a result, it is possible to display an easily viewable image.

These and other aspects of the illustrative embodiments will become more apparent from the following detailed description of the illustrative embodiments when taken in conjunction with the accompanying drawings.

BRIEF DESCRIPTION OF THE DRAWINGS

FIG. 1 is an external view of a game system according to an illustrative embodiment;

FIG. 3 is a flowchart showing a process performed by a CPU;

FIG. 6 is an illustration showing a portion of data stored in a main memory;

FIG. 7 is an illustration showing a portion of data stored in the main memory;

FIG. 8 is an illustration showing a portion of data stored in the main memory;

FIG. 21 is an illustration showing a plurality of characters in the virtual space and a barycenter;

FIG. 22 is an illustration showing a display screen corresponding to FIG. 21;

FIG. 25 is an illustration showing three positions of the virtual camera;

FIG. 26 is an illustration showing a portion of data stored in the main memory;

DESCRIPTION OF THE ILLUSTRATIVE EMBODIMENTS

Hereinafter, an illustrative embodiment will be described with reference to the drawings. A case where the illustrative embodiments are applied to a game system will be described, but the example embodiment presented herein is not limited to game systems.

Figure 2:
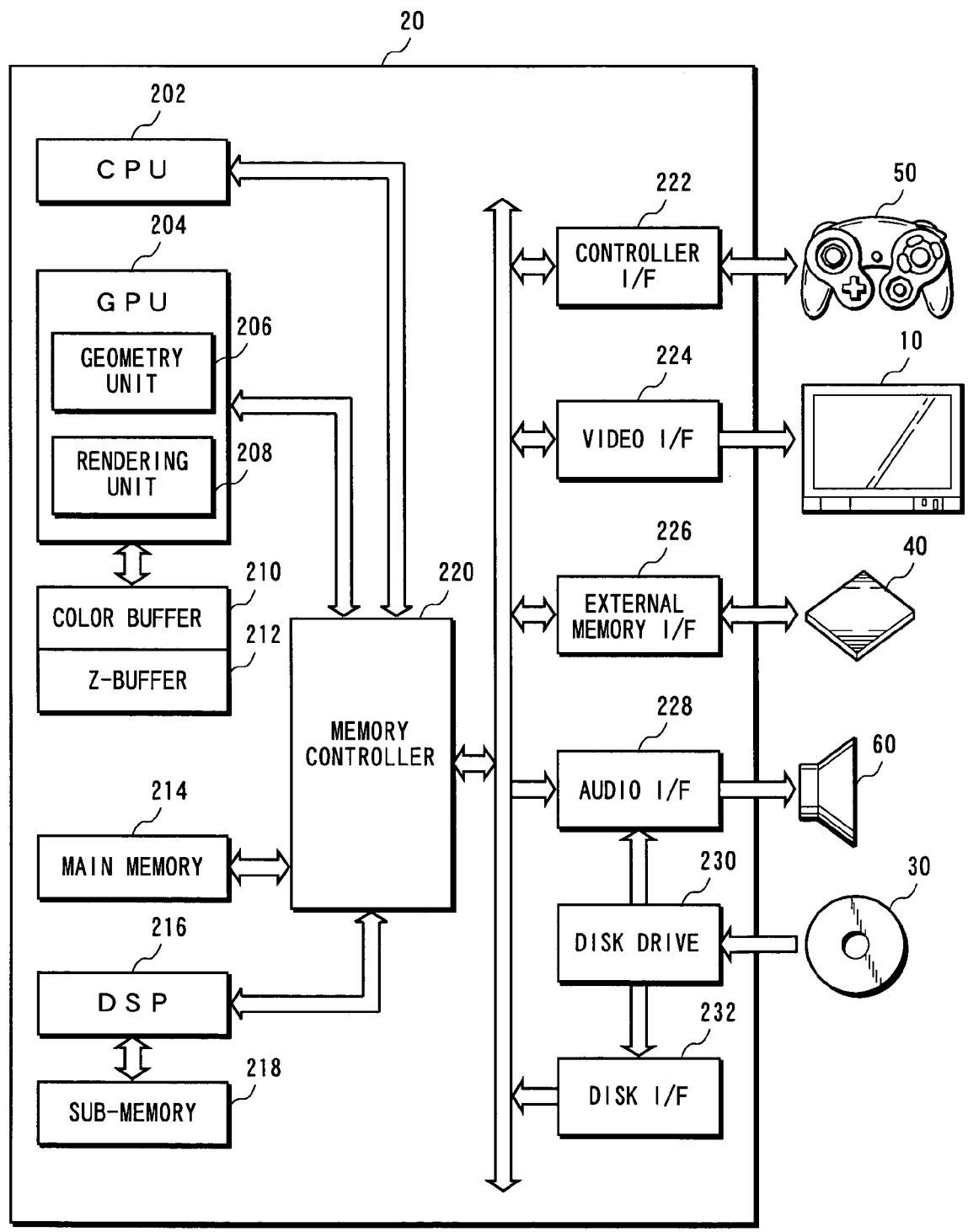
FIG. 2 is a block diagram showing the structure of a main unit.

FIG. 1 is an external view of the game system, and FIG. 2 is a block diagram thereof. As shown in FIGS. 1 and 2, the game system includes a TV monitor 10, a main unit 20, a DVD-ROM 30, an external memory card 40, a controller 50, and a loudspeaker 60. The DVD-ROM 30 and the external memory card 40 can be removably mounted on and inserted into the main unit 20. The controller 50 is connected to any one of a plurality of (in FIG. 1, four) controller port connecters, which are provided for the main unit 20, via a communication cable. The TV monitor 10 and the loudspeaker 60 are connected to the main unit 20 via an AV cable, etc. Note that communication between the main unit 20 and the controller 50 may be by radio communication. Hereinafter, with reference to FIG. 2, each component of the game system will be described in detail.

The DVD-ROM 30 fixedly stores a game program (including an image generating program) and game data, etc. When a player plays a game, the DVD-ROM 30 is mounted on the main unit 20. Note that, as means for storing a game program, etc., other external storage medium such as a CD-ROM, an MO, a memory card, or a ROM cartridge, for example, may be used in place of the DVD-ROM 30.

The external memory card 40, which is a rewritable storage medium such as a flash memory, etc., stores data such as saving data of the game.

The main unit 20 reads the program stored in the DVD-ROM 30, and performs a process in accordance with the read program.

The controller 50, which is an input device by which the player performs a game operation, has a plurality of operation switches. The controller 50 outputs operation data to the main unit 20 in response to depression, for example, of the operation switch exerted by the player.

The TV monitor 10 displays image data, which is output from the main unit 20, on a screen. The loudspeaker 60, which is typically built into a TV monitor 500, outputs audio of the game output from the main unit 20.

Next, the structure of the main unit 20 will be described. In FIG. 2, a CPU 202 and a memory controller 220 connected thereto are provided for the main unit 20. In the main unit 20, the memory controller 220 is connected to a graphics processing unit (GPU) 204, a main memory 214, a DSP 216, and various interfaces (I/F) 222, 224, 226, 228, and 232. The memory controller 220 controls data transfer between the above-described components.

When the game is started, a disk drive 230 first drives the DVD-ROM 30 mounted on the main unit 20. The game program stored in the DVD-ROM 30 is read into the main memory 214 via the disk I/F 232 and the memory controller 220. The game is started when the program on the main memory 214 is executed by the CPU 202. After the game is started, the player performs the game operation, etc., for the controller 50 using the operation switches. In accordance with the input by the player, the controller 50 outputs operation data to the main unit 20. The operation data output from the controller 50 is supplied to the CPU 202 via the controller I/F 222 and the memory controller 220. The CPU 202 performs a game process in accordance with the input operation data. The GPU 204 and the DSP 216 are used when, for example, image data is generated in the game process. Also, a sub-memory 218 is used when the DSP 216 performs a process.

The GPU 204, which includes a geometry unit 206 and a rendering unit 208, is connected to a memory dedicated to image processing. The memory dedicated to image processing is used, for example, as a color buffer 210 and a Z buffer 212. The geometry unit 206 performs calculation processing for coordinates of a three-dimensional model (for example, an object composed of polygons) of an object and a graphic form placed in a game space, which is a virtual three-dimensional space. The geometry unit 206 performs, for example, rotation, scaling, and transformation of the three-dimensional model, and converts coordinates given in a world coordinate system to a viewpoint coordinate system or a screen coordinate system. The rendering unit 208 writes color data (RGB data) of each pixel, into the color buffer 210, based on a predetermined texture with respect to the three-dimensional model projected onto the screen coordinates, thereby generating a game image. Also, the color buffer 210 is a memory area reserved for storing the game image data (RGB data) generated by the rendering unit 208. The Z buffer 212 is a memory area reserved for storing depth information from a viewpoint, which is lost when three-dimensional viewpoint coordinates are converted to two-dimensional screen coordinates. The GPU 204 generates image data to be displayed on the TV monitor 10 using these buffers, and appropriately outputs the image data to the TV monitor 10 via the memory controller 220 and the video I/F 224. Note that audio data, which is generated by the CPU 202 when the game program is executed, is output from the memory controller 220 to the loudspeaker 60 via the audio I/F 228. Note that, in this embodiment, a memory dedicated to image processing is additionally included in the hardware structure, but a method (UMA: Unified Memory Architecture) utilizing a portion of the main memory 214, for example, as a memory dedicated to image processing may be used.

Next, with reference to a flowchart of FIG. 3, an operation of the present game system will be described.

When the game is started, the CPU 202 first places a topographic object at initial coordinates of the world coordinate system, which defines a three-dimensional game space (S102). Then, the CPU 202 places a player character, a virtual camera, and a sight point of the virtual camera at initial coordinates of the world coordinate system (S104).

Next, the CPU 202 determines whether or not there is an input from the controller 50 (S106). If there is an input, the CPU 202 executes a player character position updating process (S108) and a virtual camera position updating process (S110), and proceeds to step S112. On the other hand, if there is no input from the controller 50, the CPU 202 directly proceeds to step S112. Note that details of the player character position updating process and the virtual camera position updating process will be described below.

Then, the CPU 202 converts the coordinates of the player character, etc., given in the world coordinate system to a camera coordinate system based on the virtual camera (S112), and further converts the coordinates given in the camera coordinate system to a projection plane coordinate system (S114). Then, the CPU 202 appropriately performs image processing such as texture mapping or shading, for example, and generates a game image representing a scene taken by the virtual camera (S116). Based on the generated game image, the TV monitor 10 displays a game screen (S118).

In step S120, the CPU 202 determines whether or not the game is ended. If the game is ended, the CPU 202 ends the game process. On the other hand, if the game is continued, the CPU 202 goes back to step S106.

Figure 4:
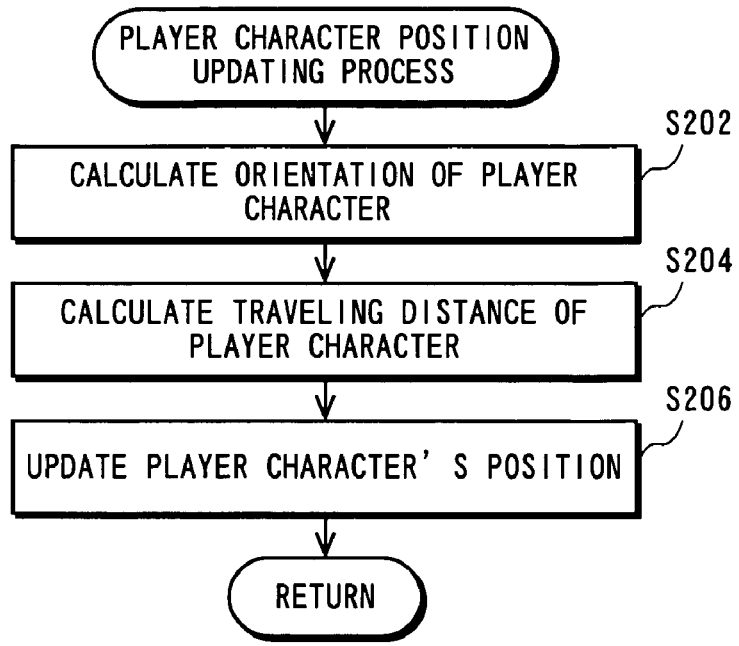
FIG. 4 is a flowchart showing a player character position updating process.

Next, with reference to a flowchart of FIG. 4, the player character position updating process performed in step S108 of FIG. 3 will be described.

When the player character position updating process is started, the CPU 202 first obtains data indicating a tilting direction of a stick of the controller 50, and calculates an orientation of the player character based on the obtained data (S202). The CPU 202 further obtains data indicating an amount of tilting of the stick, and calculates a traveling distance of the player character based on the obtained data (S204). Based on the orientation and the traveling distance of the player character obtained as described above, the CPU 202 updates the position of the player character, which is stored in the main memory 214 (S206), and ends the player character position updating process.

Next, with reference to a flowchart of FIG. 5, the virtual camera position updating process performed in step S110 of FIG. 3 will be described.

When the virtual camera position updating process is started, the CPU 202 first obtains positions of the characters (the player character and a friend character, etc.) placed in the game space (S302). Note that the positions of the characters in the game space are stored in the main memory 214 as shown in FIG. 6. Thus, the CPU 202 can read these data from the main memory 214 in step S302. The positions of the characters, which are stored in the main memory 214, are appropriately updated in accordance with the game progress.

Then, the CPU 202 obtains weights of the characters placed in the game space (S304). The weights of the characters, which are previously decided and stored in the DVD-ROM 30, are read from the DVD-ROM 30, and stored in the main memory 214 as shown in FIG. 6. Thus, the CPU 202 can read these data from the main memory 214 in step S304. In the example shown in FIG. 6, the weight of the player character is set to 10, the weights of the friend characters fa, fb, fc, . . . are set to 1, and the weights of the enemy characters ea, eb, ec, . . . are set to 3.

Note that the DVD-ROM 30 does not necessarily need to store the weights of the characters. For example, if data indicating levels of importance (A, B, C) of the characters are stored in the DVD-ROM 30 as shown in FIG. 7, the weight of each character may be obtained in step S304 as follows: the level of importance of each character is first obtained, and the level of importance of the character is converted to a weight using a conversion table as shown in FIG. 8, for example.

Next, based on the positions of the characters, which are obtained in step S302, and the weights of the characters, which are obtained in step S304, the CPU 202 calculates a barycenter of the characters (S306). The above calculation is performed as follows, for example.

Let us assume that the player character, the friend characters fa and fb, and the enemy character ea are placed in the game space. In this case, coordinates (Xb, Yb, Zb) of the barycenter are calculated as follows.

"X-coordinate of the barycenter"={("x-coordinate of the player character"×"weight of the player character")+("x-coordinate of the friend character fa"×"weight of the friend character fa")+("x-coordinate of the friend character fb"×"weight of the friend character fb")+("x-coordinate of the enemy character ea"×"weight of the enemy character ea")}/("weight of the player character"+"weight of the friend character fa"+"weight of the friend character fb"+"weight of the enemy character ea"). That is, the x-coordinate of the barycenter is calculated by the following equation:

$$Xb=\{(Xp\times 10)+(Xfa\times 1)+(Xfb\times 1)+(Xea\times 3)\}/(10+1+1+3)$$

As is the case with the x-coordinate, the y- and z-coordinates of the barycenter are calculated, respectively, as follows:

$$Yb=\{(Yp\times 10)+(Yfa\times 1)+(Yfb\times 1)+(Yea\times 3)\}/(10+1+1+3)$$

$$Zb=\{(Zp\times 10)+(Zfa\times 1)+(Zfb\times 1)+(Zea\times 3)\}/(10+1+1+3)$$

As such, in step S306, the barycenter is calculated by averaging the characters' coordinate values with values weighted by the characters' weights.

Figure 9:
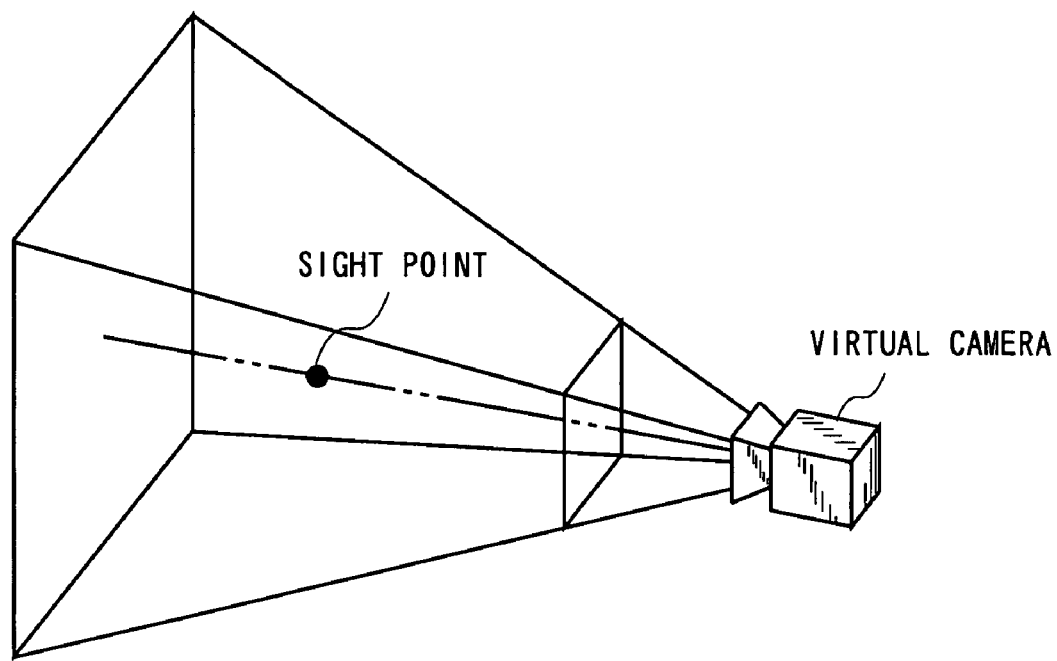
FIG. 9 is an illustration showing a relationship between an orientation of the virtual camera and a sight point.
Figure 10:
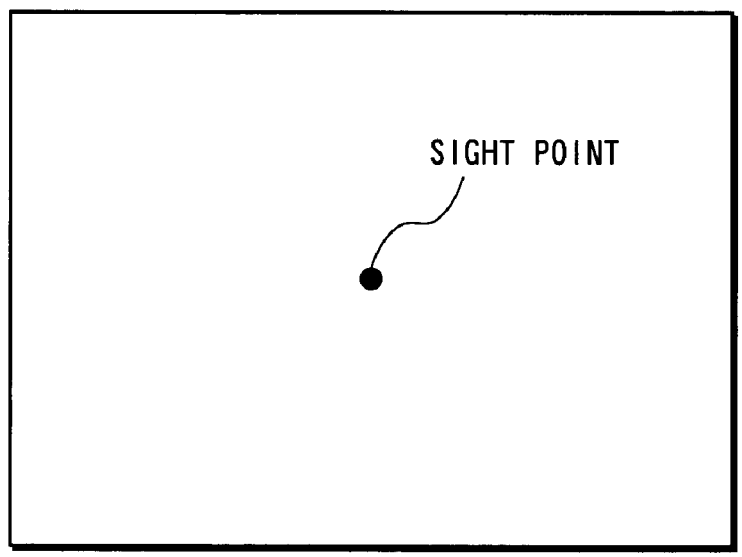
FIG. 10 is an illustration showing a relationship between a sight point and a display screen.

In a following step S308, the CPU 202 sets the sight point of the virtual camera to the barycenter calculated in step S306, and ends the virtual camera position updating process. As shown in FIG. 9, an orientation of the virtual camera is determined in accordance with the sight point. That is, as shown in FIG. 10, the sight point lies in a center of the image generated by using the virtual camera. As described above, the sight point of the virtual camera is set to the barycenter in step S308. Thus, the barycenter calculated in step S306 lies in a center of the image generated in step S116 of FIG. 3.

Hereinafter, the embodiment will be described in further detail using a more specific example.

Figure 11:
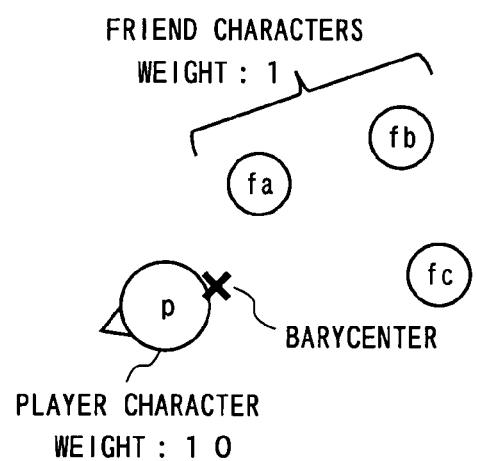
FIG. 11 is an illustration showing a plurality of characters in a virtual space and a barycenter.
Figure 12:
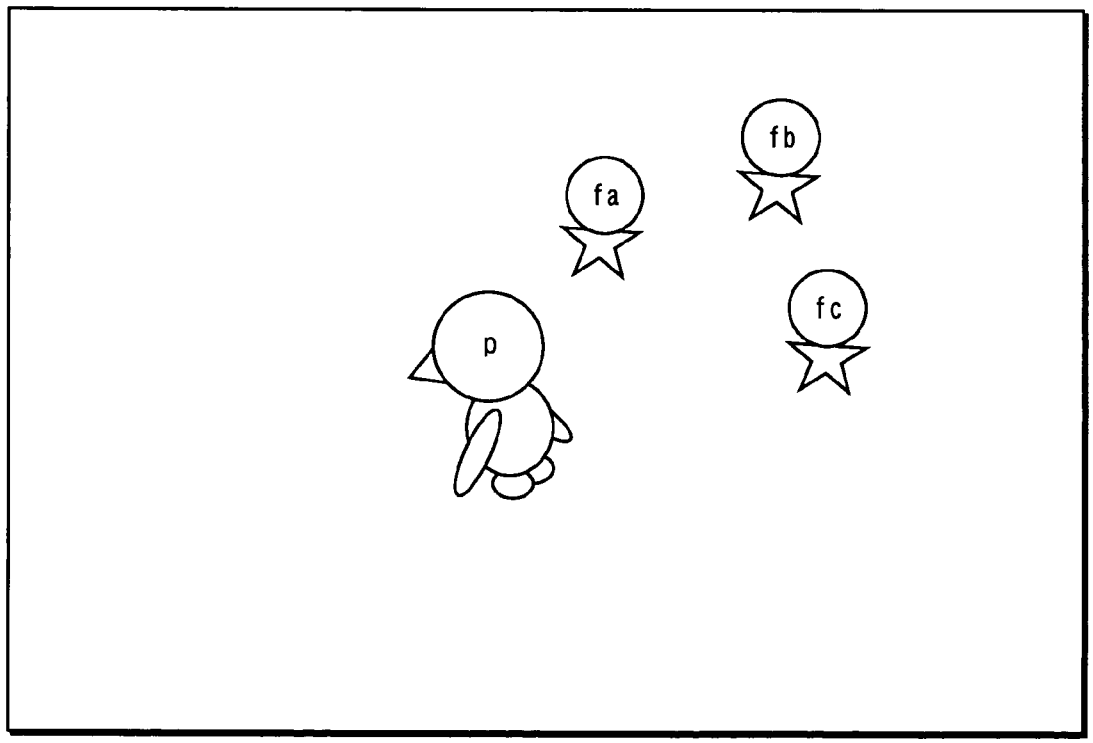
FIG. 12 is an illustration showing a display screen corresponding to FIG. 11.

As shown in FIG. 11, for example, in the case where the player character leads a party of three friend characters fa to fc in the game space, the barycenter lies near the player character, whereby an image as shown in FIG. 12, whose center coincides with the barycenter, is generated.

Figure 13:
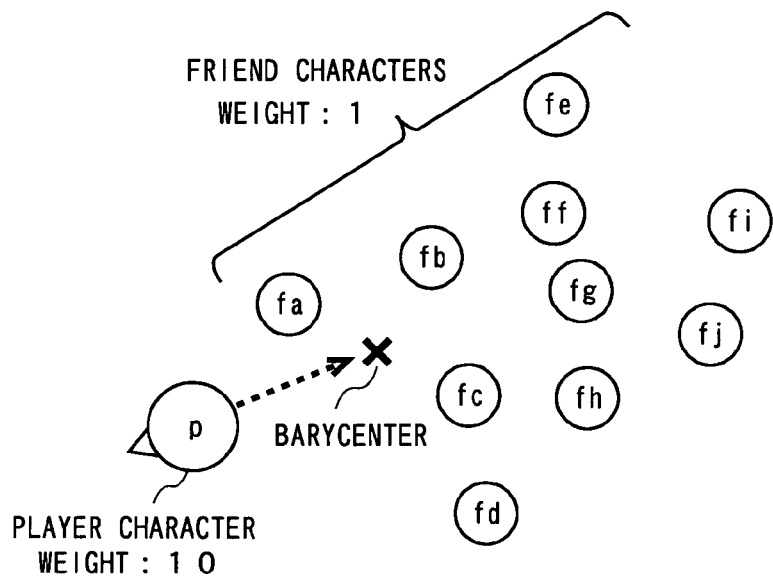
FIG. 13 is an illustration showing a plurality of characters in the virtual space and a barycenter.
Figure 14:
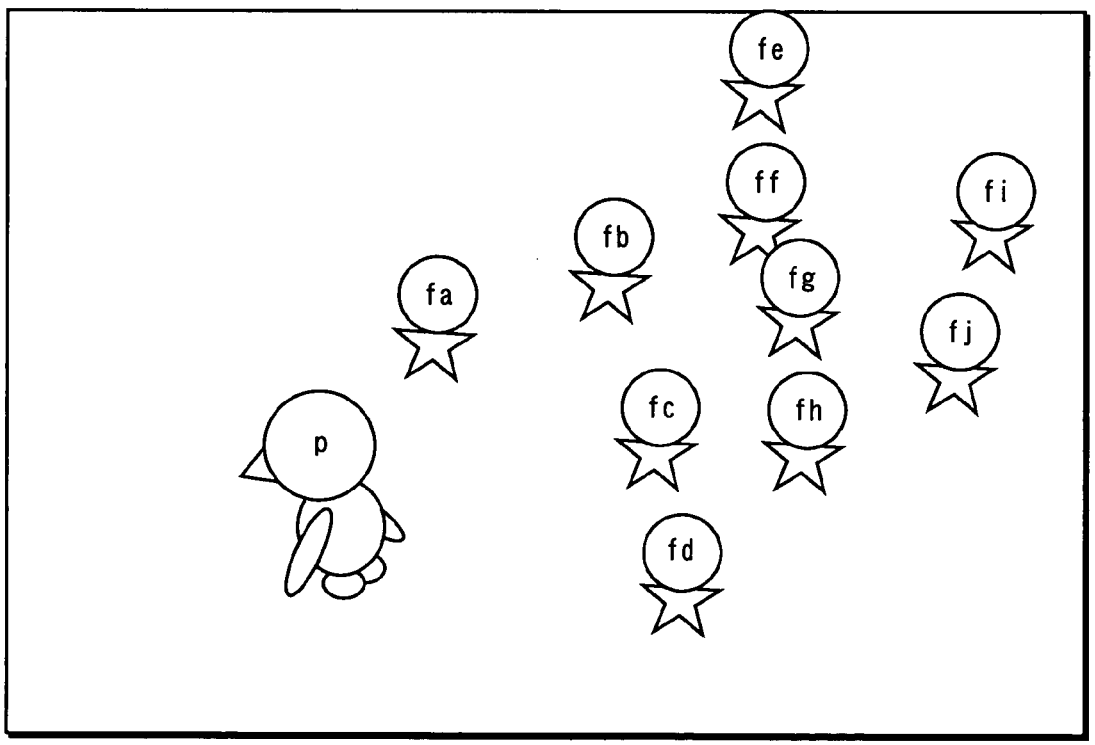
FIG. 14 is an illustration showing a display screen corresponding to FIG. 13.

Also, as shown in FIG. 13, for example, in the case where friend characters fd to fi are added to the party shown in FIG. 11, the barycenter comes closer to a center of the party compared to FIG. 11 (see an arrow in FIG. 13). As a result, as shown in FIG. 14, the player character and the friend characters are displayed in a balanced manner. If the barycenter remained in the position as shown in FIG. 11, the friend characters fe, fi, and fj would not be displayed on the screen.

Figure 15:
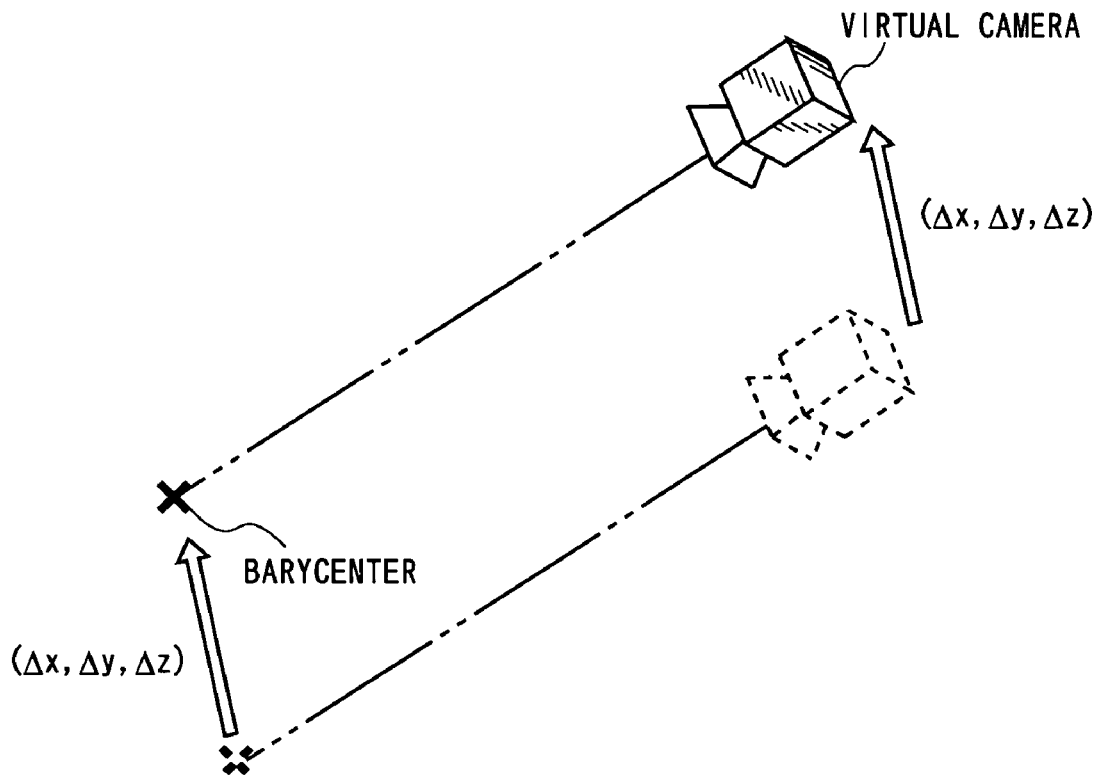
FIG. 15 is an illustration showing an exemplary setting of the virtual camera for changing its sight point in response to change of a position of a barycenter.
Figure 16:
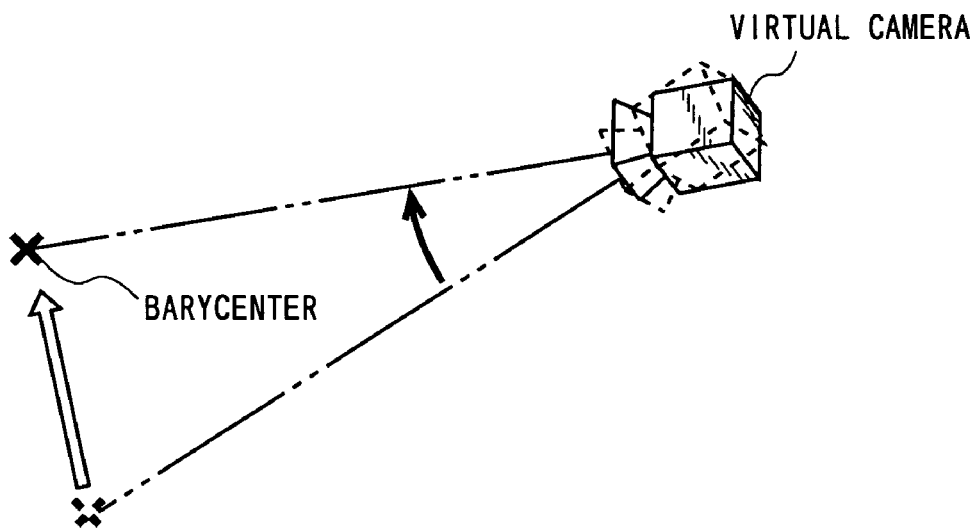
FIG. 16 is an illustration showing an exemplary setting of the virtual camera for changing its sight point in response to change of a position of a barycenter.

In the case where the position of the barycenter changes from the position as shown in FIG. 11 to the position as shown in FIG. 13, the sight point of the virtual camera has to be changed accordingly. In this case, the virtual camera may be moved parallel to a moving direction of the barycenter as shown in FIG. 15, only the orientation of the virtual camera may be changed as shown in FIG. 16, or other arbitrary methods may be used. In this case, it is preferable to adjust the sight point to the barycenter by bringing the sight point closer to the barycenter at a constant rate (corresponding to 30 percent of a distance between the sight point and the barycenter, for example) or at a constant speed, rather than immediately setting the sight point to the barycenter. As a result, even if the position of the barycenter substantially changes due to a sudden emergence of a heavy character, for example, a display area does not drastically change, and the center of the screen comes gradually closer to the emerged character. Thus, it is possible to always display an easily viewable screen.

Figure 17:
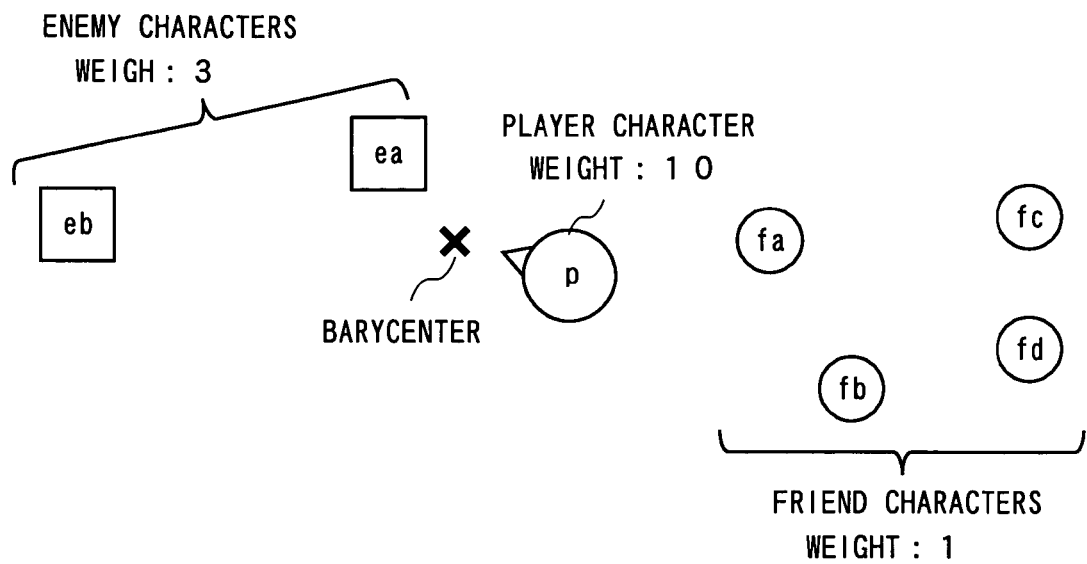
FIG. 17 is an illustration showing a plurality of characters in the virtual space and a barycenter.
Figure 18:
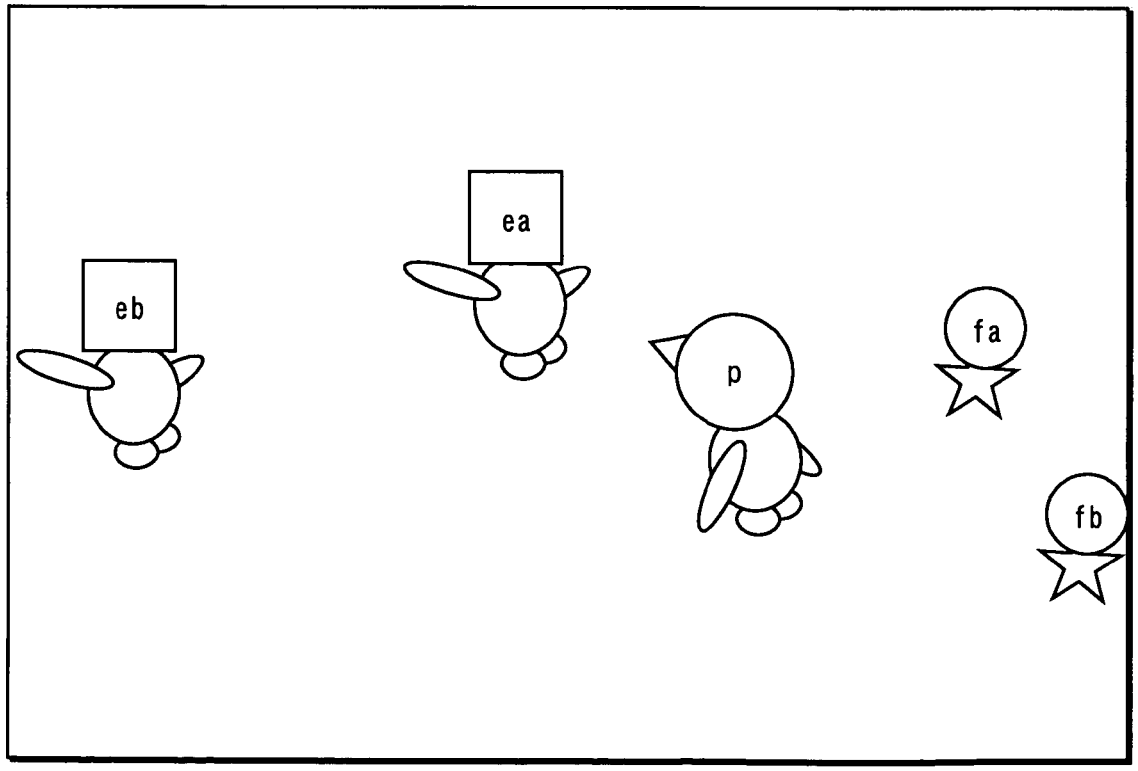
FIG. 18 is an illustration showing a display screen corresponding to FIG. 17.

Furthermore, as shown in FIG. 17, in the case where there are four friend characters behind the player character, and two enemy characters ahead of the player character, the barycenter lies ahead of the player character, even as the friend characters outnumber the enemy characters, due to a weight difference. As a result, both of the enemy characters are displayed as shown in FIG. 18, and the player character can fight with the enemy characters ea and eb while viewing their movements. As such, setting is previously performed so that an object to be displayed preferentially has a heavier weight than other characters, whereby it is possible to arbitrarily control priority based on which of the characters are displayed.

Figure 19:
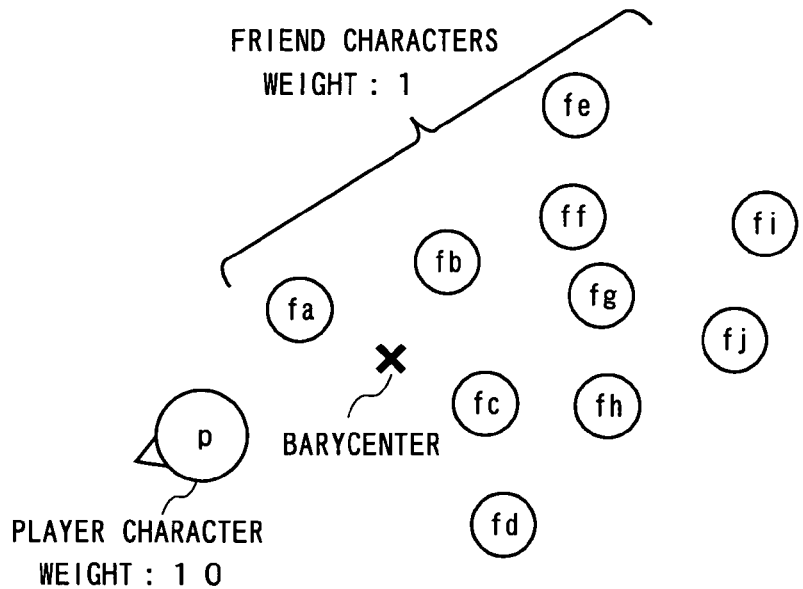
FIG. 19 is an illustration showing a plurality of characters in the virtual space and a barycenter.
Figure 20:
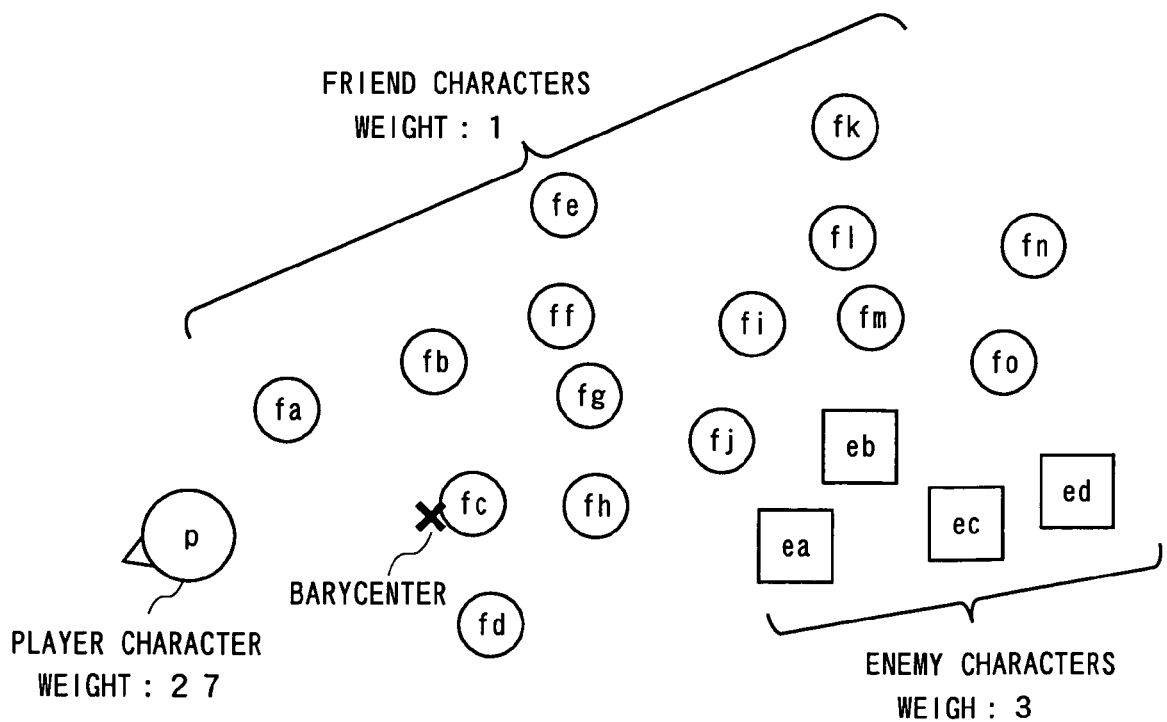
FIG. 20 is an illustration showing a plurality of characters in the virtual space and a barycenter.

If the player character operated by the player moves outside the display area, the player has difficulty in operating the player character. Thus, it is preferable to assign the heaviest weight to the player character so that it is always displayed on the screen. However, if there are a great number of other characters, the barycenter moves away from the player character and comes closer to other characters, even if the heaviest weight is assigned to the player character. In order to avoid such a problem, the weight of the player character may be determined dynamically. For example, if the sum of the weights of the characters other than the player character is dynamically assigned to the player character as its weight, the weight of the player character is 10 in FIG. 19, and the weight thereof is 27 in FIG. 20. Thus, even if the number of other characters is substantially increased, the barycenter does not so much move away from the player character. In order to realize the above-described process, the weights of the characters other than the player character are obtained based on each character's weight obtained in step S304 of FIG. 5, for example, and the sum of the weights can be used as the weight of the player character in a barycenter calculating process in step S306.

The present embodiment can be easily applied to a case of displaying a scene viewed from a player character's viewpoint. In this case, as shown in FIG. 21, a barycenter is determined based on a character other than the player character. As a result, as shown in FIG. 22, an image viewed from a first person viewpoint is generated such that a barycenter lies in a center thereof.

Figure 23:
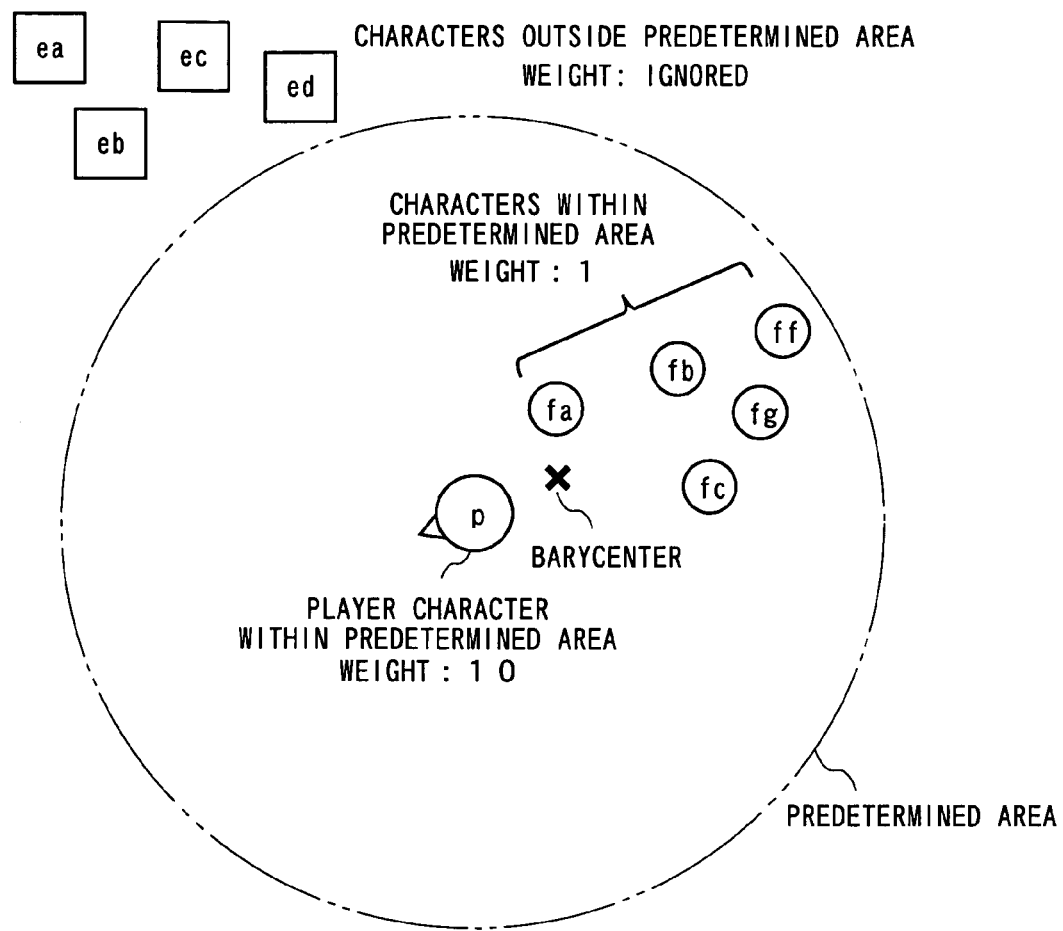
FIG. 23 is an illustration showing a plurality of characters in the virtual space and a barycenter.

As shown in FIG. 23, a weight of a character outside a predetermined area may be ignored (that is, a barycenter calculating process is not performed for the above weight; in other words, the above weight is assumed to be zero). For example, in the case where some other characters are located far away from the player character in the game space, the barycenter is set in an unexpected position due to an influence of these characters. Therefore, as shown in FIG. 23, only a weight of a character within a reasonably limited area is taken into consideration, whereby it is possible to avoid the above-described problem. In order to realize the above process, a process for extracting characters located within a predetermined area is added as a previous stage of step S302 of FIG. 5, for example, and a barycenter calculating process in steps S302 to S306 is performed for the extracted character. By this additional process, a calculating process for characters outside the predetermined area can be omitted.

In FIG. 23, it is assumed that a predetermined area is a closed area whose outer edge is at a predetermined distance from the player character, but it is not limited thereto. The predetermined area may be arbitrarily set. For example, the predetermined area may be a rectangular area whose center is at a predetermined distance from a front of the player character, or may be a closed area whose outer edge is at a predetermined distance from the sight point.

Figure 24:
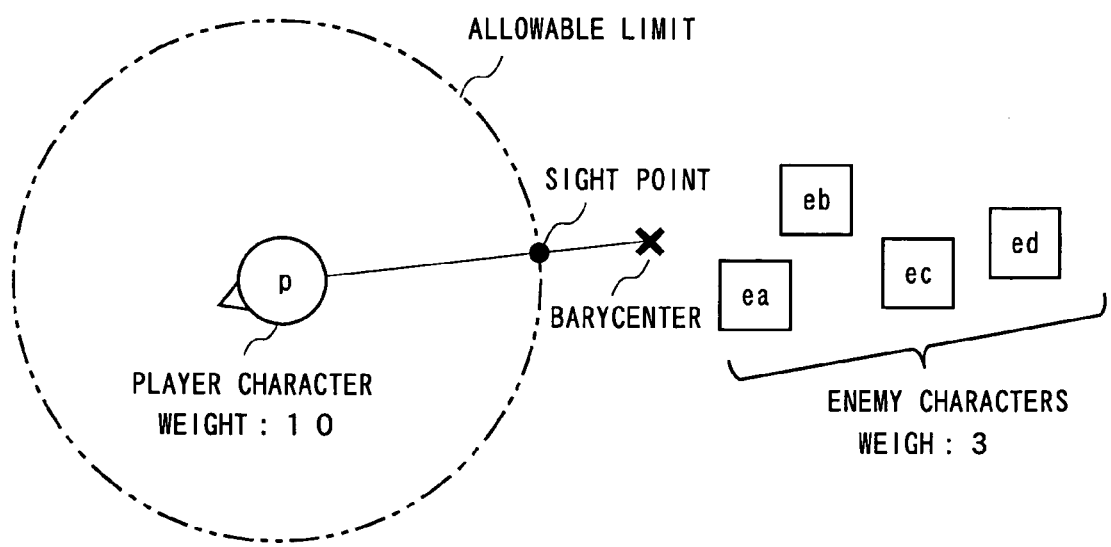
FIG. 24 is an illustration showing a plurality of characters in the virtual space, a barycenter, and a sight point.

In order to ensure that the player character is always displayed, as shown in FIG. 24, a sight point may be limited within a predetermined allowable limit which is centered around the player character. For example, as shown in FIG. 24, in the case where a barycenter lies outside the allowable limit, an intersection point of a line segment connecting the barycenter and the player character and an outer edge of the allowable limit is set as a sight point. In order to realize the above-described process, for example, a process performed in step S308 of FIG. 5 may be replaced with a process in which determination is made whether or not the barycenter lies within the allowable limit. If the determination is made that the barycenter lies within the allowable limit, a sight point is set to a position of the barycenter. On the other hand, if the determination is made that the barycenter lies outside the allowable limit, a sight point is set to an intersection point of a line segment connecting the barycenter and the player character and an outer edge of the allowable limit.

In the case where a distance between the virtual camera and the sight point changes, it is preferable that the weight of the player character changes in accordance with the above distance. Hereinafter, the above-described case will be described with reference to FIGS. 25 to 28.

Here, as shown in FIG. 25, a case in which the virtual camera can be placed in one of three relative positions (first to third positions) based on the sight point will be described. In this case, the weight of the player character is set in accordance of a position of the virtual camera. As shown in FIG. 26, the closer the distance between the sight point and the virtual camera becomes, the heavier the player character becomes. In place of preparing a table as shown in FIG. 26, the weight of the player character may be calculated using the distance between the sight point and the virtual camera as an argument.

Figure 27:
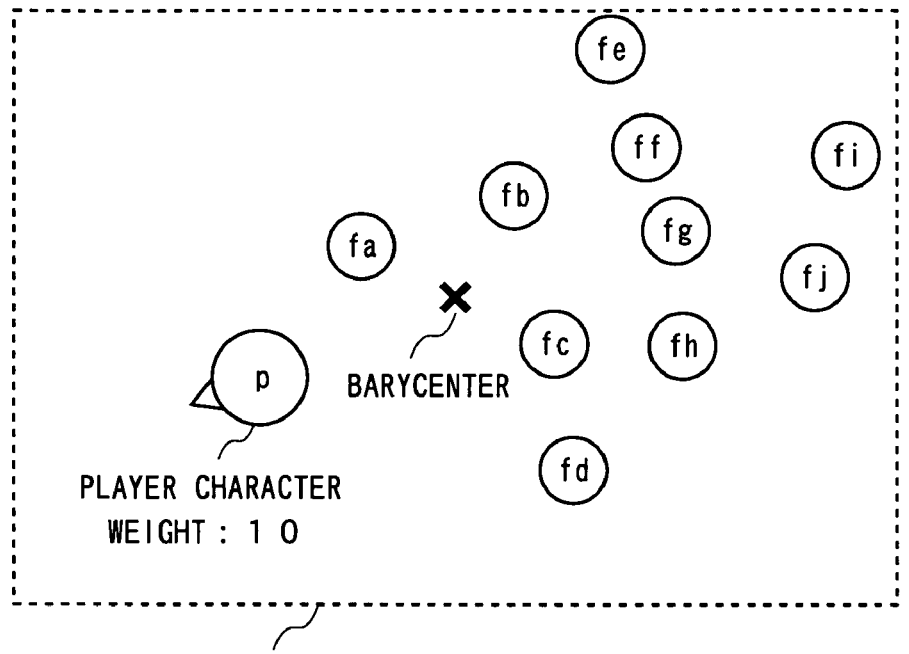
FIG. 27 is an illustration showing a plurality of characters in the virtual space and a barycenter in the case where the virtual camera is placed in a first position.
Figure 28:
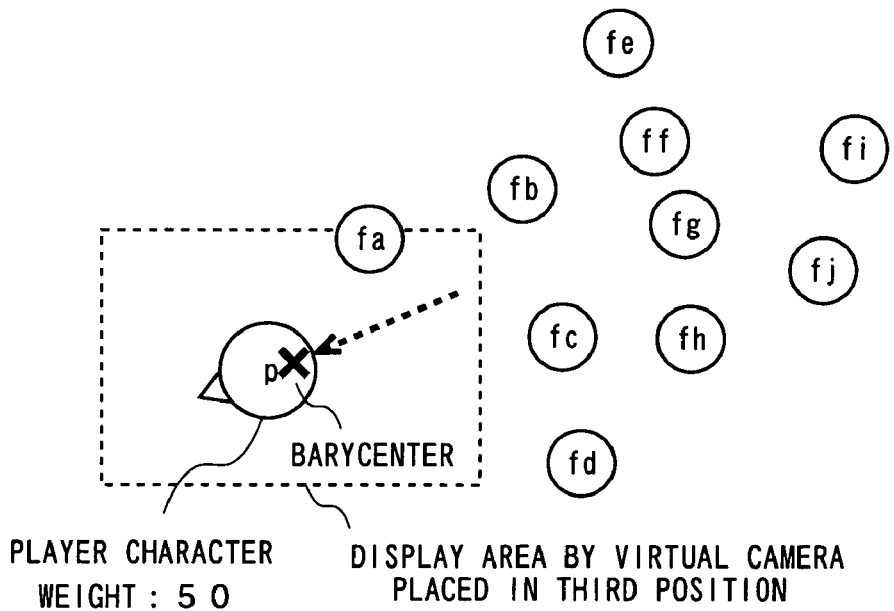
FIG. 28 is an illustration showing a plurality of characters in the virtual space and a barycenter in the case where the virtual camera is placed in a third position.

FIG. 27 is an illustration showing a position of a barycenter in the case where the virtual camera is placed in a first position, and a display area whose center corresponds to the barycenter. If the virtual camera changes its position from the first position to the third position whereas the player character maintains the same weight (that is, 10), the player character is pushed off the display area because the image is zoomed in on using the barycenter as shown in FIG. 27 as a center point. However, if the weight of the player character changes from 10 to 50 when the position of the virtual camera changes from the first position to the third position, the barycenter comes closer to the player character as shown in FIG. 28, whereby the player character is reliably displayed.

Figure 5:
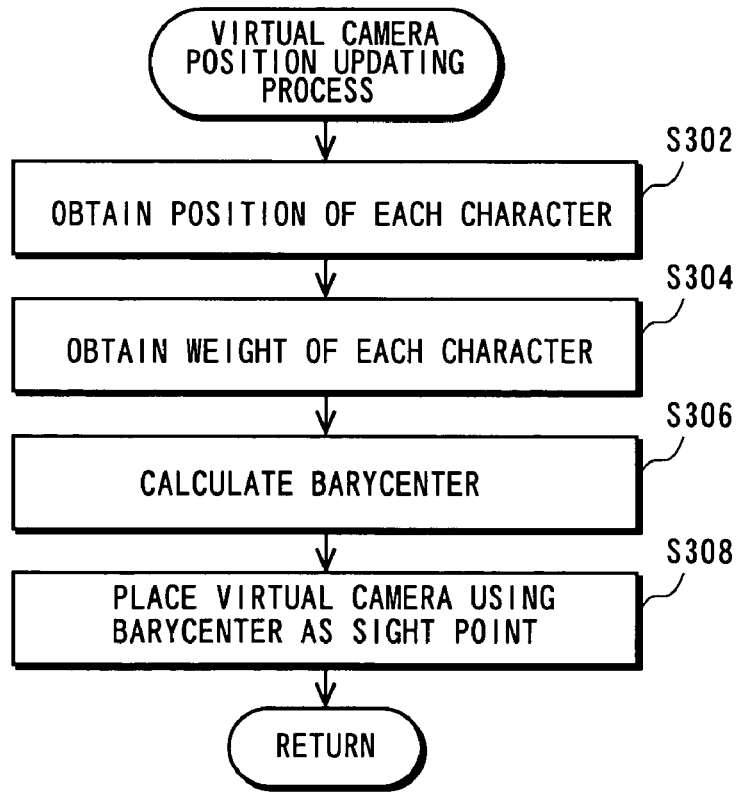
FIG. 5 is a flowchart showing a virtual camera position updating process.

In order to realize the above-described process, the main memory 214 stores the table as shown in FIG. 26 by reading the table from the DVD-ROM 30, for example, and determination is made on whether the virtual camera is placed in the first, second or third position when the weight of each character is obtained in step S304 of FIG. 5. Based on the above determination, the weight of the player character can be obtained by referring to the table of FIG. 26.

Note that, in one illustrative embodiment, a case of displaying the characters placed in the three-dimensional game space has been described. The same can be easily applied to a case of displaying the characters placed in a two-dimensional game space. In this case, a barycenter is calculated based on the position and the weight of each character, and an image in which the calculated barycenter lies in approximately the center thereof is generated.

Also, in one illustrative embodiment, a case of displaying the player character, the friend character, and the enemy character, which are placed in the game space, has been described. However, it is also possible to display other objects in a similar manner. For example, it is possible to assign a weight to a stationary object such as a tree.

While the example embodiment presented herein has been described in detail, the foregoing description is in all aspects illustrative and not restrictive. It is understood that numerous other modifications and variations can be devised without departing from the scope of the example embodiment.

What is claimed is:

1. A storage medium for storing an image generating program which causes a computer to generate a display image used for displaying a plurality of objects placed in a two-dimensional or three-dimensional virtual space, wherein
the image generating program causes the computer to perform:
storing weighted values of the objects;
storing positions of the objects in the virtual space;
determining a barycenter of the objects based on the weighted values and the positions of the objects; and
generating a display image in which the barycenter lies in approximately a center of the display image, wherein
a heaviest weighted value is assigned to a player character which is operable by a player, and wherein
a weighted value equal to or greater than a sum of weighted values of objects other than the player character is dynamically assigned to the player character.

2. The storage medium according to claim 1, wherein the player character, as one of the objects, is displayed preferentially by virtue of having assigned to it the heavier weighted value than other objects.

3. The storage medium according to claim 1, wherein
a level of importance is previously provided for each object, and
the image generating program further causes the computer to perform assigning a heavier weighted value to the player character, as one of the objects, for which a higher level of importance is provided compared to other objects.

4. The storage medium according to claim 1, wherein, in the determining a barycenter, the image generating program causes the computer to determine a barycenter of objects placed within a predetermined area, which is a portion of the virtual space.

5. The storage medium according to claim 1, wherein, if a barycenter determined by the determining a barycenter lies outside a predetermined allowable limit which is centered around specific one object of the plurality of objects, the image generating program causes the computer, in the generating a display image, to generate a display image in which an intersection point of a line segment, connecting the barycenter and the specific one object, and an outer edge of the allowable limit lies in approximately a center of the display image.

6. The storage medium according to claim 1, wherein,
the virtual space is a three-dimensional virtual space, and
the display image generating further includes generating a display image using a virtual camera whose sight point is the barycenter.

7. The storage medium according to claim 6, wherein a weighted value of a specific one object of the plurality of objects changes in accordance with a position of the virtual camera.

8. The storage medium according to claim 7, wherein the closer a distance between the virtual camera and the sight point becomes, the heavier a weighted value of the specific one object becomes.

9. The storage medium according to claim 1, wherein
the virtual space is a three-dimensional space, and
the generating a display image further includes generating a display image by bringing the sight point of a virtual camera closer to the barycenter determined by the determining a barycenter at a constant rate.

10. A game device for generating a display image used for displaying a plurality of objects placed in a two-dimensional or three-dimensional virtual space, comprising:
weight storage locations for storing weighted values of the objects;
position storage locations for storing positions of the objects in the virtual space;
barycenter determination programmed logic circuitry for determining a barycenter of the objects based on the weighted values and the positions of the objects; and
display image generating programmed logic circuitry for generating a display image in which the barycenter lies in approximately a center of the display image, wherein
a heaviest weighted value is assigned to a player character which is operable by a player, and wherein
a weighted value equal to or greater than a sum of weighted values of objects other than the player character is dynamically assigned to the player character.

11. A method of displaying a virtual environment containing a plurality of virtual objects comprising:
storing a weighted value for at least two of the virtual objects;
storing a position value for the at least two virtual objects;
determining an average position between the at least two virtual objects based at least in part on the stored weighted values and positions for each of the at least two virtual objects; and
displaying a virtual environment wherein a displayed center of the displayed environment depends at least in part on the position determined by the determining an average position, wherein
a heaviest weighted value is assigned to a player character which is operable by a player, and wherein
a weighted value equal to or greater than a sum of weighted values of objects other than the player character is dynamically assigned to the player character.

12. The method of claim 11, wherein the virtual environment is a two-dimensional environment.

13. The method of claim 11, wherein the virtual environment is a three-dimensional environment and the displaying a virtual environment further includes displaying a virtual environment wherein the sight point of a virtual camera is the displayed center.

* * * * *